US010123358B2

(12) United States Patent
Fakoorian et al.

(10) Patent No.: US 10,123,358 B2
(45) Date of Patent: Nov. 6, 2018

(54) PRIORITY MANAGEMENT FOR NEW RADIO-SPECTRUM SHARING (NR-SS)

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, Riverside, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/612,435

(22) Filed: Jun. 2, 2017

(65) Prior Publication Data

US 2018/0184463 A1    Jun. 28, 2018

Related U.S. Application Data

(60) Provisional application No. 62/438,210, filed on Dec. 22, 2016.

(51) Int. Cl.
*H04W 74/08* (2009.01)
*H04W 16/14* (2009.01)

(52) U.S. Cl.
CPC ....... *H04W 74/0875* (2013.01); *H04W 16/14* (2013.01); *H04W 74/0808* (2013.01)

(58) Field of Classification Search
CPC ............. H04W 74/0875; H04W 16/14; H04W 74/0808; H04W 74/08; H04W 72/12;

(Continued)

(56) References Cited

U.S. PATENT DOCUMENTS

2006/0089099 A1    4/2006  Buchwald et al.
2007/0230600 A1*  10/2007  Bertrand ............... H04J 13/00
                                                         375/260

(Continued)

FOREIGN PATENT DOCUMENTS

WO    WO-2015017463 A2    2/2015

OTHER PUBLICATIONS

Chung W-C., et al., "A Cognitive Priority-based Resource Management Scheme for Cognitive Femtocells in LTE Systems", IEEE, Wireless Networking Symposium, ICC 2013, pp. 1-5.

(Continued)

*Primary Examiner* — Nathan Taylor
(74) *Attorney, Agent, or Firm* — Haynes and Boone, LLP

(57) ABSTRACT

Wireless communications systems and methods related to managing dynamic priority-based spectrum access are provided. A first wireless communication device transmits dynamic priority information for accessing a shared spectrum in a transmission opportunity (TXOP). The shared spectrum is shared by a plurality of network operating entities. The first wireless communication device is associated with a first network operating entity of a plurality of network operating entities. The dynamic priority information indicates an access priority of the first network operating entity among the plurality of network operating entities in the TXOP. The first wireless communication device communicates with a second wireless communication device associated with the first network operating entity in the TXOP based on the dynamic priority information.

30 Claims, 13 Drawing Sheets

(58) Field of Classification Search
CPC .............. H04W 72/04; H04W 72/0446; H04W 72/0453; H04W 72/0413; H04W 72/042; H04W 72/082; H04W 72/1215; H04W 74/002; H04W 74/0816; H04W 84/12; H04W 16/10; H04W 24/00; H04W 24/08; H04W 52/38; H04W 72/087; H04W 72/1205; H04W 72/1231; H04W 72/1242; H04W 72/1247; H04W 72/1263; H04W 72/1284; H04W 72/1294; H04W 74/004; H04W 74/006; H04W 74/02; H04W 74/04
USPC .................................................. 455/454, 450
See application file for complete search history.

(56) References Cited

U.S. PATENT DOCUMENTS

| | | | |
|---|---|---|---|
| 2009/0180492 A1 | 7/2009 | Hu | |
| 2013/0208587 A1* | 8/2013 | Bala | H04W 16/14 370/230 |
| 2014/0080535 A1* | 3/2014 | Gauvreau | H04W 16/14 455/513 |
| 2015/0245374 A1* | 8/2015 | Mitola, III | G06Q 30/08 370/329 |
| 2015/0373554 A1* | 12/2015 | Freda | H04W 16/14 455/450 |
| 2015/0382374 A1* | 12/2015 | Bhorkar | H04W 24/00 370/330 |
| 2016/0021664 A1 | 1/2016 | Chou | |
| 2016/0227578 A1* | 8/2016 | Lee | H04W 74/004 |
| 2016/0373935 A1 | 12/2016 | Smith et al. | |
| 2016/0381692 A1 | 12/2016 | Hareuveni et al. | |
| 2017/0041957 A1* | 2/2017 | Pazhyannur | H04W 74/0808 |
| 2017/0055293 A1* | 2/2017 | Yang | H04L 47/24 |
| 2017/0085348 A1 | 3/2017 | Clancy et al. | |
| 2017/0188241 A1* | 6/2017 | Mueck | H04W 16/14 |
| 2017/0290059 A1* | 10/2017 | Karaki | H04W 74/0816 |
| 2017/0359815 A1* | 12/2017 | Chendamarai Kannan | H04L 5/0044 |
| 2017/0374557 A1* | 12/2017 | Mueck | H04W 72/0453 |

OTHER PUBLICATIONS

International Search Report and Written Opinion—PCT/US2017/059082—ISA/EPO—Jan. 26, 2018.

* cited by examiner

PRIORITY MANAGEMENT FOR NEW RADIO-SPECTRUM SHARING (NR-SS)

CROSS REFERENCE TO RELATED APPLICATIONS

The present application claims priority to and the benefit of the U.S. Provisional Patent Application No. 62/438,210, filed Dec. 22, 2016, which is hereby incorporated by reference in its entirety as if fully set forth below and for all applicable purposes.

TECHNICAL FIELD

This application relates to wireless communication systems, and more particularly to managing dynamic priority-based spectrum access in a shared frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

One drawback of the priority-based coordinated access scheme is that the priorities of the network operators and/or the partitioning of the shared spectrum are typically predetermined and semi-statically configured. Thus, the priority-based coordinated access scheme may not adapt to scheduling requirements of the network operators in a timely manner Accordingly, improved procedures allowing dynamic configuration and management of priority-based spectrum access are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device associated with a first network operating entity of a plurality of network operating entities, dynamic priority information for accessing a shared spectrum in a transmission opportunity (TXOP), wherein the shared spectrum is shared by the plurality of network operating entities, and wherein the dynamic priority information indicates an access priority of the first network operating entity among the plurality of network operating entities in the TXOP; and communicating, by the first wireless communication device, with a second wireless communication device associated with the first network operating entity in the TXOP based on the dynamic priority information.

In an additional aspect of the disclosure, a method of wireless communication includes receiving, by a first wireless communication device from a second wireless communication device, dynamic priority information for accessing a shared spectrum in a transmission opportunity (TXOP), wherein the shared spectrum is shared by a plurality of network operating entities, and wherein the first wireless communication device and the second wireless communication device are associated with a first network operating entity of the plurality of network operating entities, wherein the dynamic priority information indicates an access priority of the first network operating entity among the plurality of network operating entities in the TXOP; and communicating, by the first wireless communication device, with the second wireless communication device based on the dynamic priority information.

In an additional aspect of the disclosure, an apparatus includes a transmitter configured to transmit dynamic priority information for accessing a shared spectrum in a transmission opportunity (TXOP), wherein the shared spectrum is shared by a plurality of network operating entities, wherein the apparatus is associated with a first network operating entity of the plurality of network operating entities, and wherein the dynamic priority information indicates an access priority of the first network operating entity among the plurality of network operating entities in the TXOP; and a processor configured to communicate with a wireless communication device associated with the first network operating entity in the TXOP based on the dynamic priority information In an additional aspect of the disclosure, an apparatus includes a receiver configured to receive, from a wireless communication device, dynamic priority information for accessing a shared spectrum in a transmission opportunity (TXOP), wherein the shared spectrum is shared by a plurality of network operating entities, and wherein the apparatus and the wireless communication device are associated with a first network operating entity of the plurality of network operating entities, wherein the dynamic priority information indicates an access priority of the first network operating entity among the plurality of network operating entities in the TXOP; and a processor configured to communicate with the wireless communication device based on the dynamic priority information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
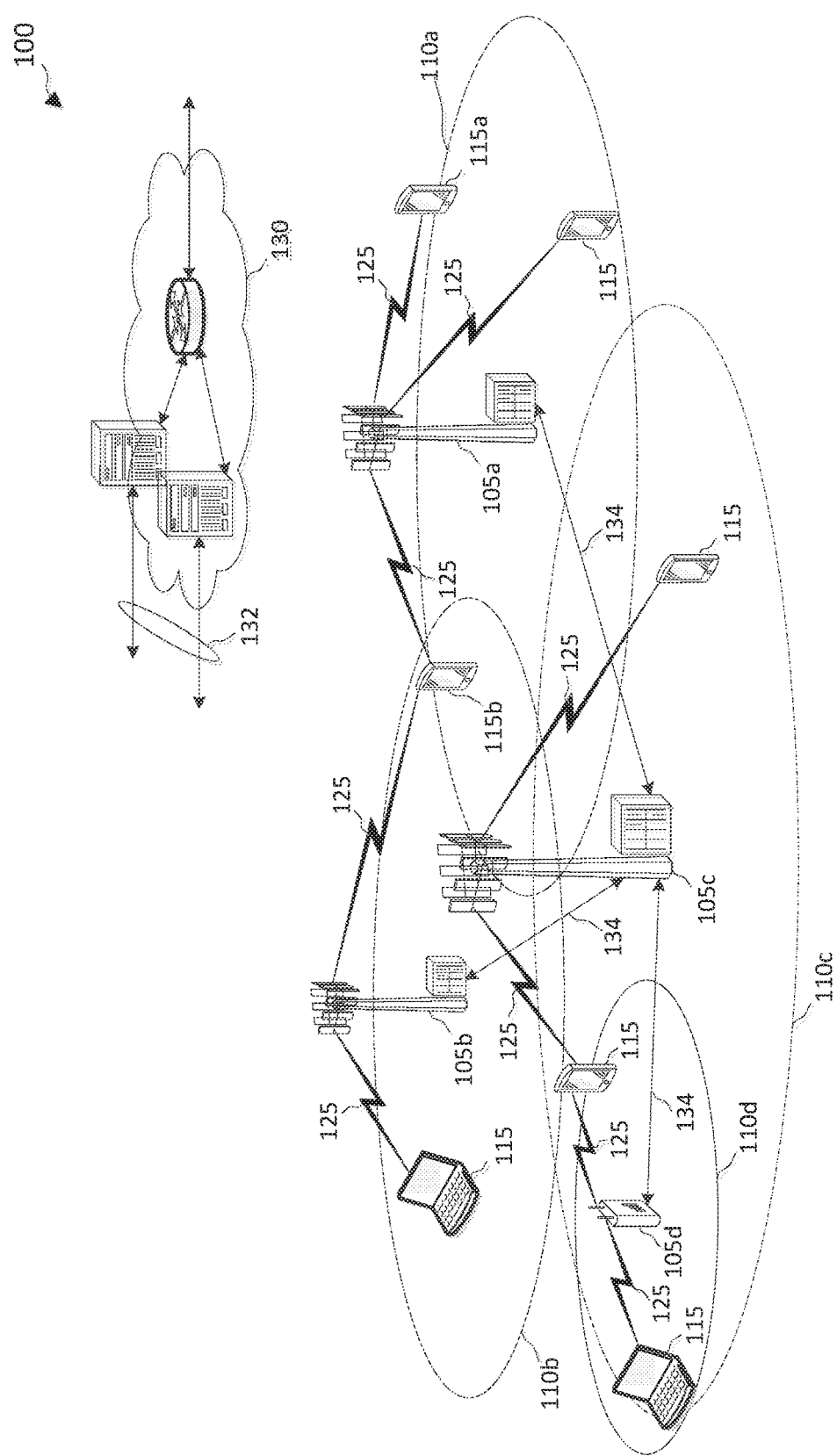
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWav bands) network.

The present disclosure describes dynamic priority management mechanisms for spectrum sharing. In a priority-based spectrum sharing scheme, a shared spectrum is time-partitioned into transmission opportunities (TXOPs). Each TXOP is designated for prioritized use by a prioritized or (e.g., high priority) network operating entity and opportunistic use by low priority network operating entities based on reservations. The disclosed embodiments allow dynamic configurations of TXOPs. For example, the priority orders of the network operating entities may be different for different TXOPs. A base station (BS) may transmit dynamic priority information for a TXOP at the beginning of the TXOP. A receiving user equipment (UE) may decode the dynamic priority information to determine an access priority of the BS. In one embodiment, the dynamic priority information may explicitly indicate an access priority of a network operating entity or a BS, for example, in the form of a message. In another embodiment, the dynamic priority information may implicitly indicate an access priority of a network operating entity or a BS, for example, in the form of a cyclically-shifted preamble sequence, where access priorities may be associated with cyclic shifts and/or timing offsets.

The present disclosure may provide several benefits. The disclosed embodiments can respond and adapt to scheduling requirements of network operating entities, for example, by configuring priority orders based on the scheduling requirements. Thus, the disclosed embodiments may provide better support for ultra-reliability low latency communication (UR-LLC) traffic. In addition, the disclosed embodiments may improve fading and cell-edge performances. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit a channel state information—reference signal (CSI-RS) to enable a UE 115 to estimate a DL channel Similarly, a UE 115 may transmit a sounding reference signal (SRS) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum. In addition, certain time periods may be allocated for certain types of communication or access over the shared spectrum. Further, by allowing dynamic priority assignments and dynamic partitioning of the shared spectrum may further improve coordinated access performance, for example, adapting the scheduling requirements of the network operating entities, as described in greater detail herein.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
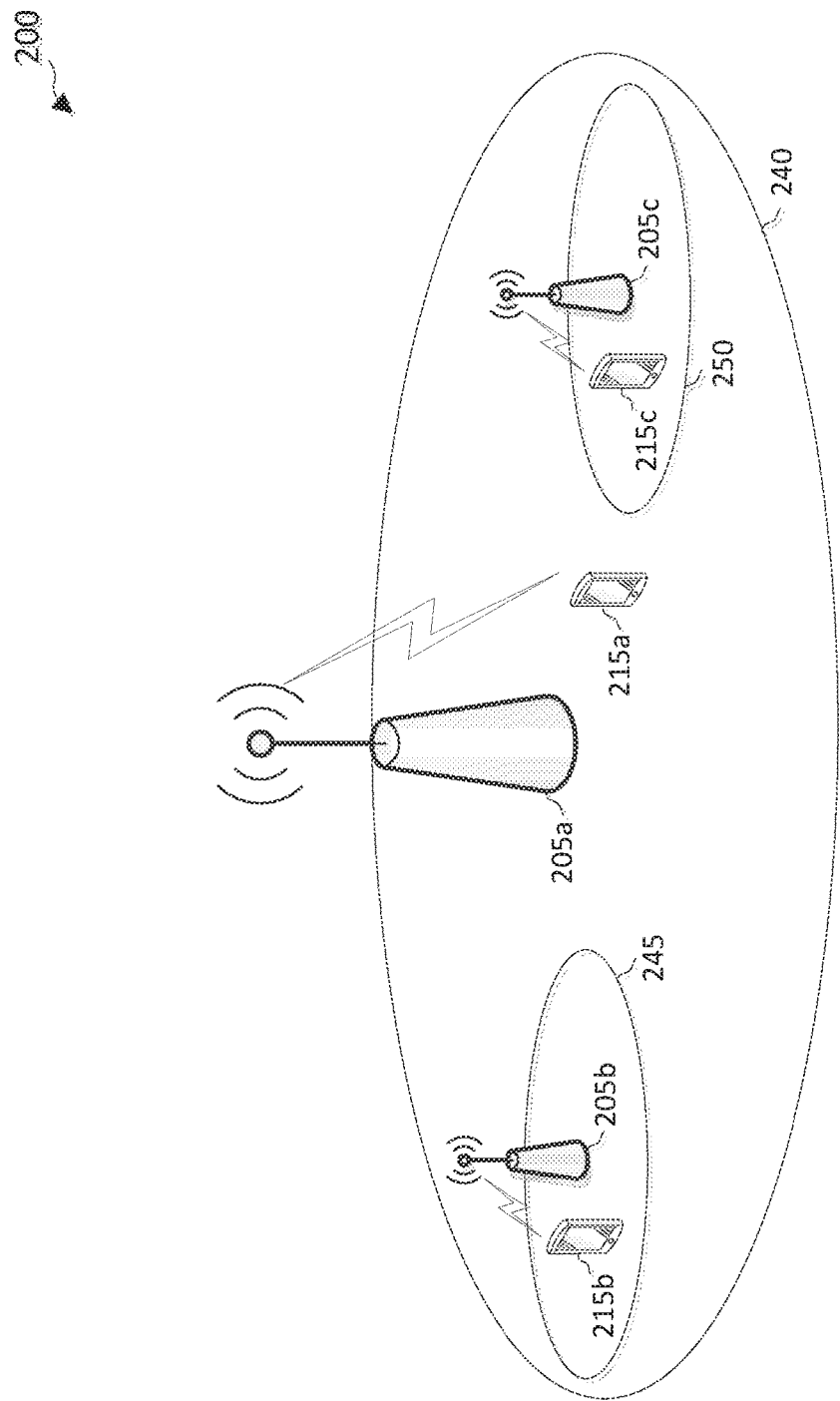
FIG. 2 illustrates an example of a wireless communications network that supports priority-based spectrum sharing according to embodiments of the present disclosure.

FIG. 2 illustrates an example of a wireless communications network 200 that supports priority-based spectrum sharing according to embodiments of the present disclosure. The network 200 may be similar to the network 100. FIG. 2 illustrates three BSs 205 and three UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UE 215b in a pico cell 245 within a coverage area of the macro cell 240. The BSs 205c serves the UE 215c in another pico cell 250 within the coverage area of the macro cell 240. The BSs 105 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different priorities for sharing the spectrum to minimize interference. For example, the BSs 205a and the UE 215a may be treated as one network operating entity (e.g., Operator A), the BS 205b and the UE 215b may be treated as another network operating entity (e.g., Operator B), and the BS 205c and the UE 215c may be treated as yet another network operating entity (e.g., Operator C). In the present disclosure, the terms network operating entity and operator may be used interchangeably and may be associated with a particular priority and/or power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner The claiming of the time periods for prioritized use or opportunistic use may be based on reservations, as described in greater detail herein.

Figure 3:
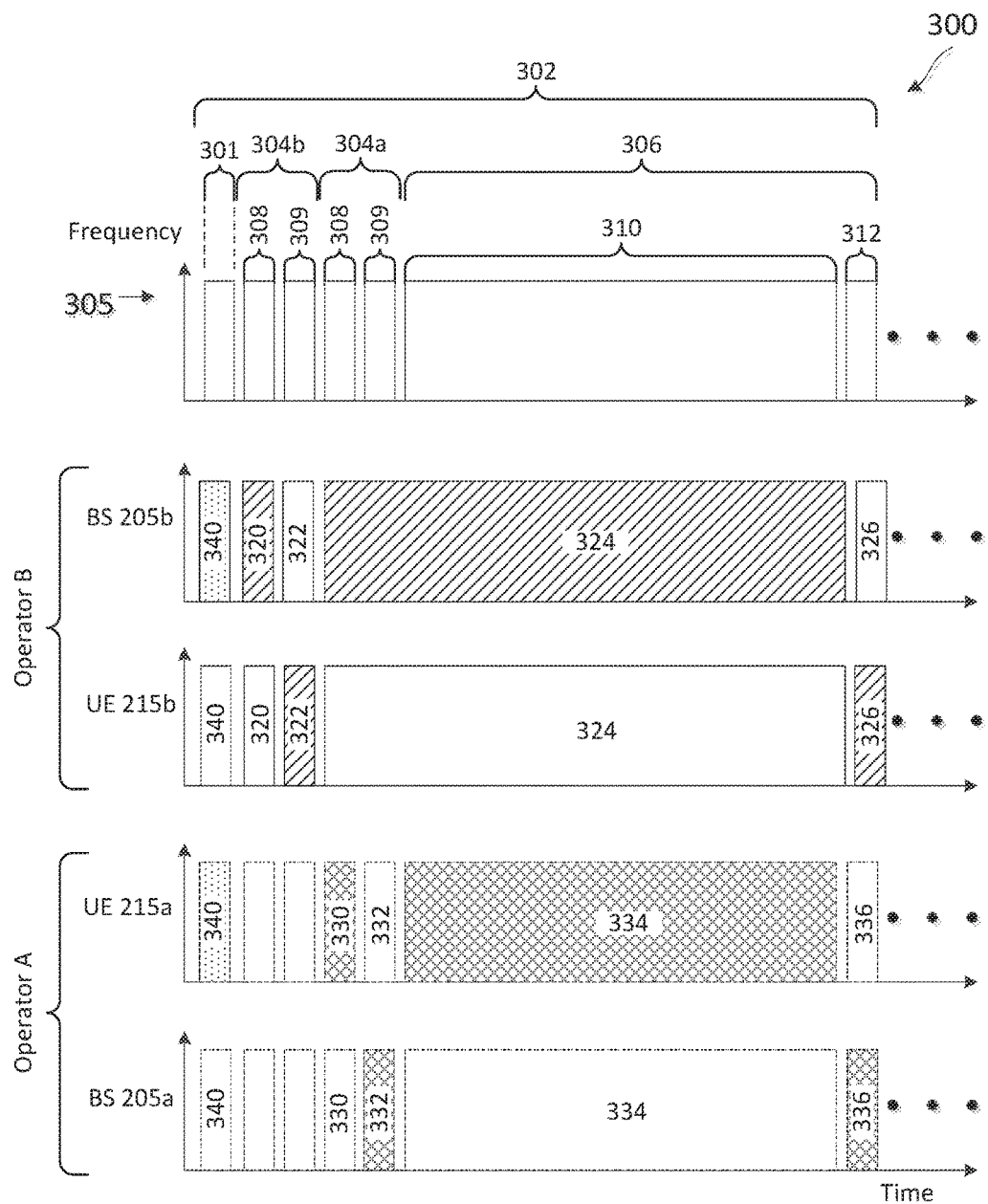
FIG. 3 illustrates a priority-based spectrum sharing scheme according to embodiments of the present disclosure.

FIG. 3 illustrates a priority-based spectrum sharing scheme 300 according to embodiments of the present disclosure. The x-axis represents time in some constant units. The y-axis represents frequency in some constant units. The scheme 300 may be employed by the BSs 105 and 205 and the UEs 115 and 215 to access a shared spectrum. In the scheme 300, the spectrum is time-partitioned into a plurality of transmit opportunities (TXOPs) 302 as shown in the frame structure 305. The TXOPs may be defined in units of OFDM symbols, subframes, slots, and/or any suitable time format. Each TXOP 302 includes a plurality of channel sensing or clear channel assessment (CCA) periods 304 followed by a transmission period 306. Each CCA period 304 is assigned to a particular network operating entity (e.g., the pico cell 245 or the macro cell 240). The assigned network operating entity may transmit a reservation in the CCA period 304 to reserve the following transmission period 306 for communications. While the scheme 300 is illustrated with two operators (e.g., Operator A and Operator B), the scheme 300 can be applied to any suitable number of operators.

Each CCA period 304 is divided into two portions 308 and 309, for example, for transmitting a reservation request signal and a reservation response signal, respectively. The CCA periods 304 can be arranged in a decreasing order of priorities. Thus, a low priority operator node can monitor the channel (e.g., the shared spectrum) in the CCA periods 304 of higher priorities. Upon detection of a reservation from a higher priority operator node, the low priority operator node may refrain from transmitting in the following transmission period 306.

The transmission period 306 can be used for UL and/or DL transmissions. For example, the transmission period 306 may include two portions 310 and 312. The portion 310 can have a longer duration than the portion 312. For DL-centric communications, the portion 310 can be used for DL data transmission and the portion 312 can be used for UL control transmission. Alternatively, for UL-centric communications, the portion 310 can be used for UL data transmission and the portion 312 can be used for UL control transmission.

As an example, Operator B (e.g., the pico cell 245) is assigned with a higher priority than Operator A (e.g., the macro cell 240) in the particular TXOP 302. As such, the high-priority CCA period 304b is assigned to Operator B and the low-priority CCA period 304a is assigned to Operator A. Thus, Operator B nodes has prioritized access in the transmission period 306, while Operator A nodes may opportunistically access the transmission period 306 when the transmission period 306 is not reserved by Operator B nodes.

For prioritized access, the BS 205b may transmit a reservation request signal 320 in the portion 308 of the CCA period 304b to reserve the following transmission period 306, for example, for a DL-centric transmission. In response, the UE 215b may transmit a reservation response signal 322 in the portion 309 of the CCA period 304b. The reservation request signal 320 can be a pre-determined preamble or a request-to-send (RTS) signal. Similarly, the reservation response signal 322 can be a pre-determined preamble or a clear-to-send (CTS) signal. In some embodiments, the reservation request signal 320 can be a DL transmission trigger (e.g., a DL control signal carrying DL scheduling information) and the reservation response signal 322 can be a SRS. The BS 205a and the UE 215a may detect the reservation request signal 320 and/or the reservation response signal 322 and yield spectrum access to the Operator B.

Subsequently, the BS 205b may communicate with the UE 215b in the transmission period 306. The transmission period 306 may begin after the CCA period 304b (e.g., occupying the low-priority CCA period 304a). The BS 205b may transmit a DL data signal 324, for example, based on the DL scheduling information, in the portion 310. The UE 215b may transmit a UL control signal 326, for example, carrying scheduling request (SR) and hybrid automatic repeat request (HARQ) information. The DL data signal 324 may carry DL data for the UE 205b.

For opportunistic access, the BS 205a and the UE 215a may listen for a reservation from high-priority operator nodes (e.g., the BS 205b and the UE 215b) in the CCA period 304b. When no reservation is detected, the BS 205a may access the TXOP 302 using similar mechanisms as the BS 205b. For example, the BS 205a sends a reservation request signal 330 in the portion 308 of the CCA period 304a. The UE 215a may send a reservation response signal 332 in the portion 309 of the CCA period 304a. Subsequently, the BS 205a may communicate with the UE 215a in the transmission period 306 as shown by a DL data signal 334 and a UL control signal 336.

In some embodiments, the TXOP 302 may further include an acquisition period 301 at the beginning of the TXOP 302. The acquisition period 301 can be used by the BSs 205a and 205b to transmit TXOP configuration signals 340 carrying TXOP configuration information. The TXOP configuration signal 340 may include a duration of the TXOP 302, a number of CCA periods 304 in the TXOP, and/or a duration of each CCA period 304, as described in greater detail herein. The acquisition period 301 may be a common region for all operators or may include multiple exclusive regions, each designated to a particular operator.

Figure 4:
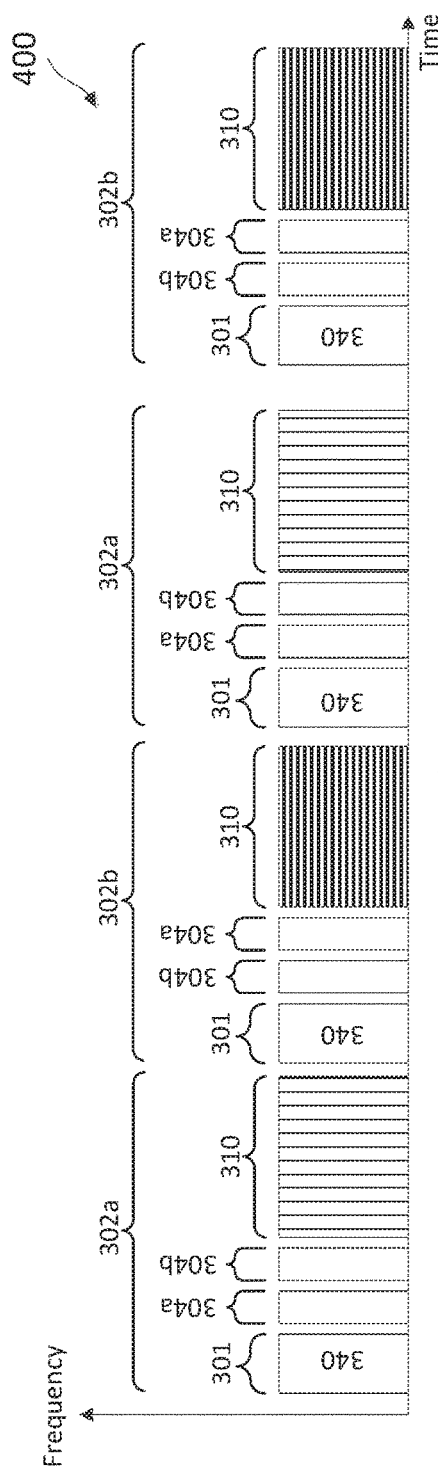
FIG. 4 illustrates a semi-static priority-based spectrum sharing scheme according to embodiments of the present disclosure.

FIG. 4 illustrates a semi-static priority-based spectrum sharing scheme 400 according to embodiments of the present disclosure. The x-axis represents time in some constant units. The y-axis represents frequency in some constant units. The scheme 400 may be employed by the BSs 105 and 205 and the UEs 115 and 215 to access a shared spectrum. The scheme 400 is similar to the scheme 300, but provides a view of priority assignments across time. In the scheme 400, the priorities for Operator A and Operator B are semi-statically configured according to a fixed pattern. For example, the priorities of Operator A and Operator B rotates among the TXOPs 302 based on a round-robin fashion, where the TXOPs 302a are designated for prioritized use by Operator A and the TXOPs 302b are designated for prioritized use by Operator B.

One advantage of the scheme 400 is simple signaling. For example, a central SAS authority may determine priority orders for the operators. The BSs of each operator may access the TXOPs based on the assigned priority. The priorities are transparent to the UEs. However, since the priority orders for the operators are semi-statically configured, the scheme 400 may not respond or adapt to scheduling or traffic changes. In addition, in the scheme 400, two far-away UEs (e.g., the UEs 215b and 215c) with different priorities are not allowed to transmit at the same time. Further, the scheme 400 may not perform well or satisfy the latency requirements of UR-LLC services since transmission of UR-LLC data may be required to wait for an assigned prioritized access TXOP or wait for higher priority nodes to vacate in an opportunistic access TXOP.

Figure 5:
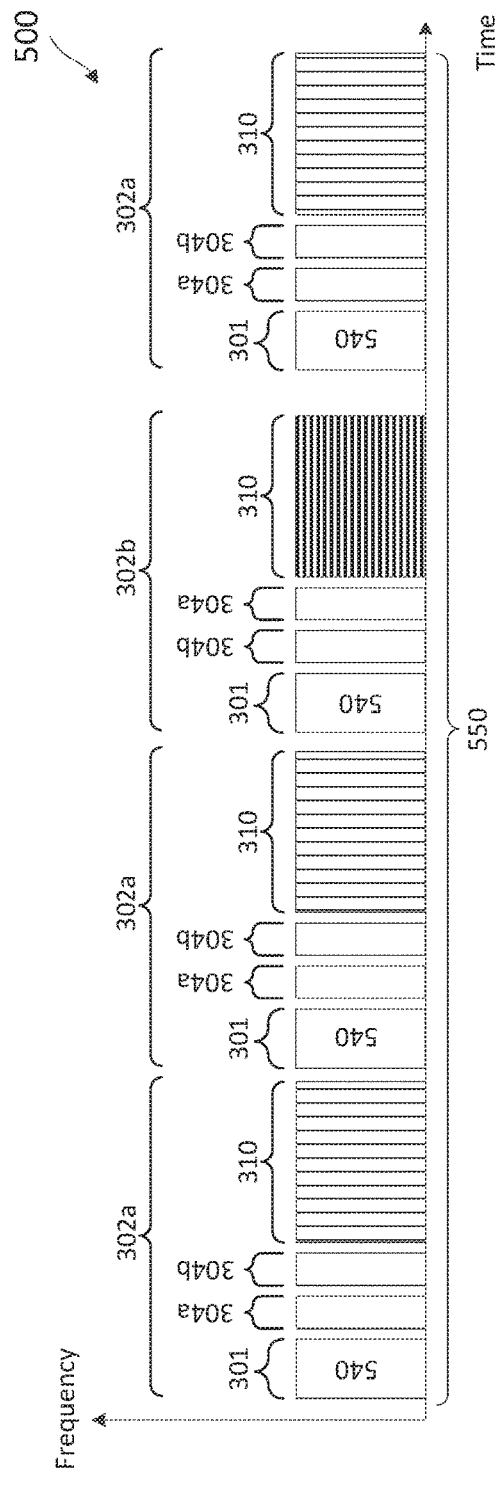
FIG. 5 illustrates a dynamic priority-based spectrum sharing scheme according to embodiments of the present disclosure.

FIG. 5 illustrates a dynamic priority-based spectrum sharing scheme 500 according to embodiments of the present disclosure. The x-axis represents time in some constant units. The y-axis represents frequency in some constant units. The scheme 500 may be employed by the BSs 105 and 205 and the UEs 115 and 215 to access a shared spectrum. In the scheme 500, the priority orders for the operators may be dynamically managed and reconfigured at the beginning of every TXOP 302 or every N number of TXOPs 302, where N is a positive integer. For example, the highest priority operator can be different for different TOXPs 302 based on quality of quality-of-service (QoS) offerings or other scheduling and/or traffic requirements. Thus, the scheme 500 may provide better support for UR-LLC services. In addition, a BS may dynamically choose a priority from allowed priorities based on the UEs to be scheduled in each TXOP 302. For example, Operator A may have a higher scheduling requirement than Operator B for a certain time period 550. Thus, Operator A can be assigned with more prioritized access TXOPs than Operator B during the time period 550. As shown, three TXOPs 302a are designated for prioritized use by Operator A and one TXOP 302b is designated for prioritized use by Operator B in the time period 550.

In one embodiment, while the priority order may change from one TXOP to another TXOP, the priority information may be transparent to the UEs. For example, the UEs 215b may detect a reservation from the BS 205b in one of the CCA periods 304, where the placement of the CCA period 304 in the TXOP 302 implicitly indicate the access priority of Operator B. When a TXOP 302 includes N number of CCA periods 304, a UE may be required to detect UL and/or DL triggers for up to N CCA periods 304 without explicit access priority information. In addition, the UE may be required to perform energy detection for both UL and DL signals for up to (N-1) number of CCA periods 304. In some embodiments, the UE may choose to stop monitoring the channel when no reservation or DL/UL trigger is detected in the CCA periods 304, for example, when no resource reclaiming is supported. Resource reclaiming refers to a prioritized network operating entity reclaiming an unused TXOP without a prior reservation. In other embodiments, the scheme 500 may include additional signaling mechanisms to indicate dynamic priority information. For example, a BS may transmit a dynamic priority information signal 540 in the acquisition period 301. The dynamic priority information signal 540 may carry a message explicitly indicating an assigned access priority or a preamble signal encoded with an assigned access priority, as described in greater detail herein.

Figure 6:
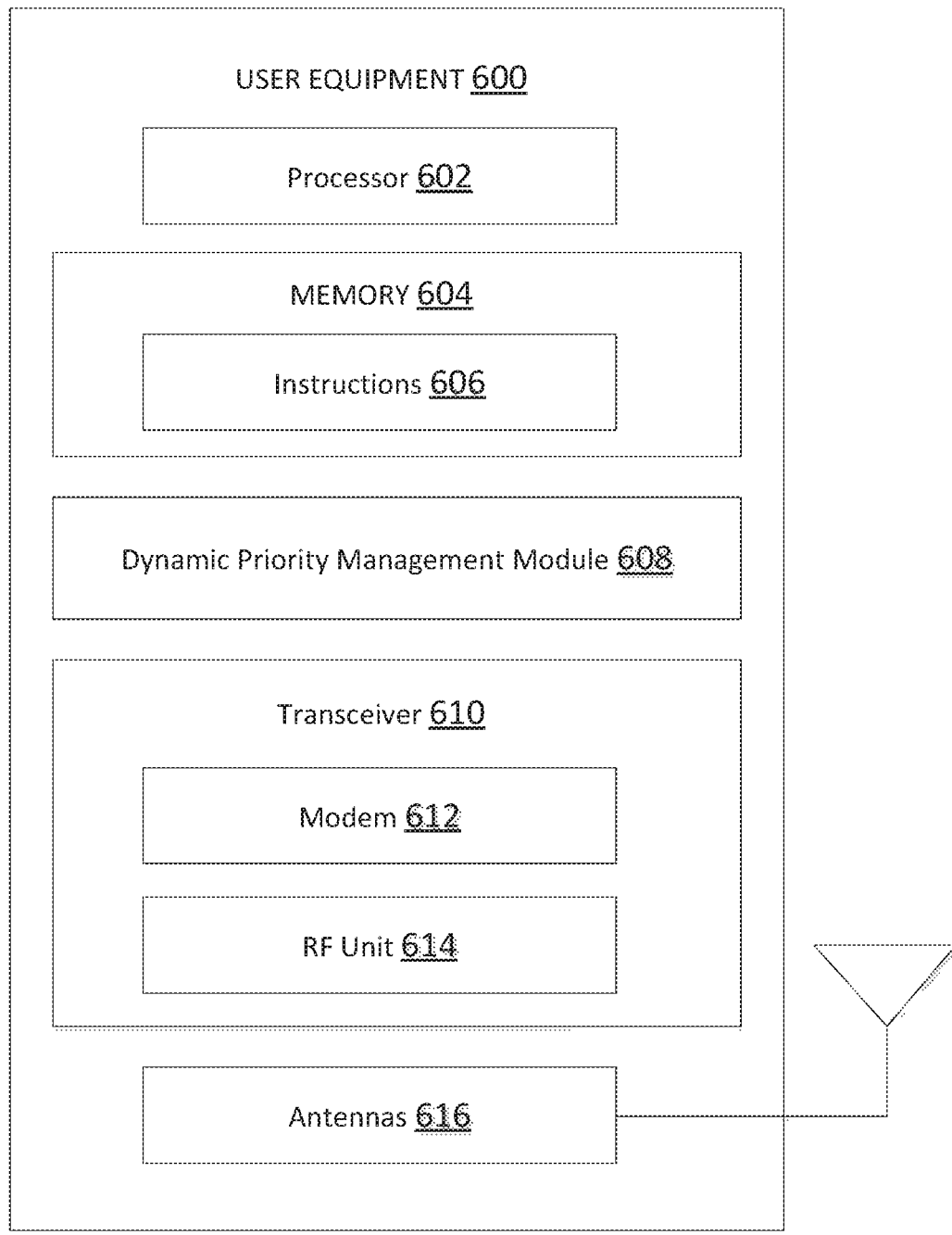
FIG. 6 is a block diagram of an exemplary user equipment (UE) according to embodiments of the present disclosure.

FIG. 6 is a block diagram of an exemplary UE 600 according to embodiments of the present disclosure. The UE 600 may be a UE 115 or 215 as discussed above. As shown, the UE 600 may include a processor 602, a memory 604, a dynamic priority management module 608, a transceiver 610 including a modem subsystem 612 and a radio frequency (RF) unit 614, and an antenna 616. These elements may be in direct or indirect communication with each other, for example via one or more buses.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 215 in connection with embodiments of the present disclosure. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The dynamic priority management module 608 may be used for various aspects of the present disclosure. For example, the dynamic priority management module 608 is configured to decode dynamic priority information, identify transmission opportunities in a shared spectrum based on the dynamic priority information, perform network listening, and reserve time periods for using the shared spectrum, as described in greater detail herein.

As shown, the transceiver 610 may include the modem subsystem 612 and the RF unit 614. The transceiver 610 can be configured to communicate bi-directionally with other devices, such as the BSs 105 and 205. The modem subsystem 612 may be configured to modulate and/or encode the data from the memory 604 and/or the dynamic priority management module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215 or a BS 205. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 215 to enable the UE 215 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of clear-to-send (CTS) signals according to embodiments of the present disclosure. The antenna 616 may further receive data messages transmitted from other devices. This may include, for example, reception of request-to-send (RTS) and/or CTS signals according to embodiments of the present disclosure. The antenna 616 may provide the received data messages for processing and/or demodulation at the transceiver 610. Although FIG. 6 illustrates antenna 616 as a single antenna, antenna 616 may include multiple antennas of similar or different designs in order to sustain multiple transmission links. The RF unit 614 may configure the antenna 616.

Figure 7:
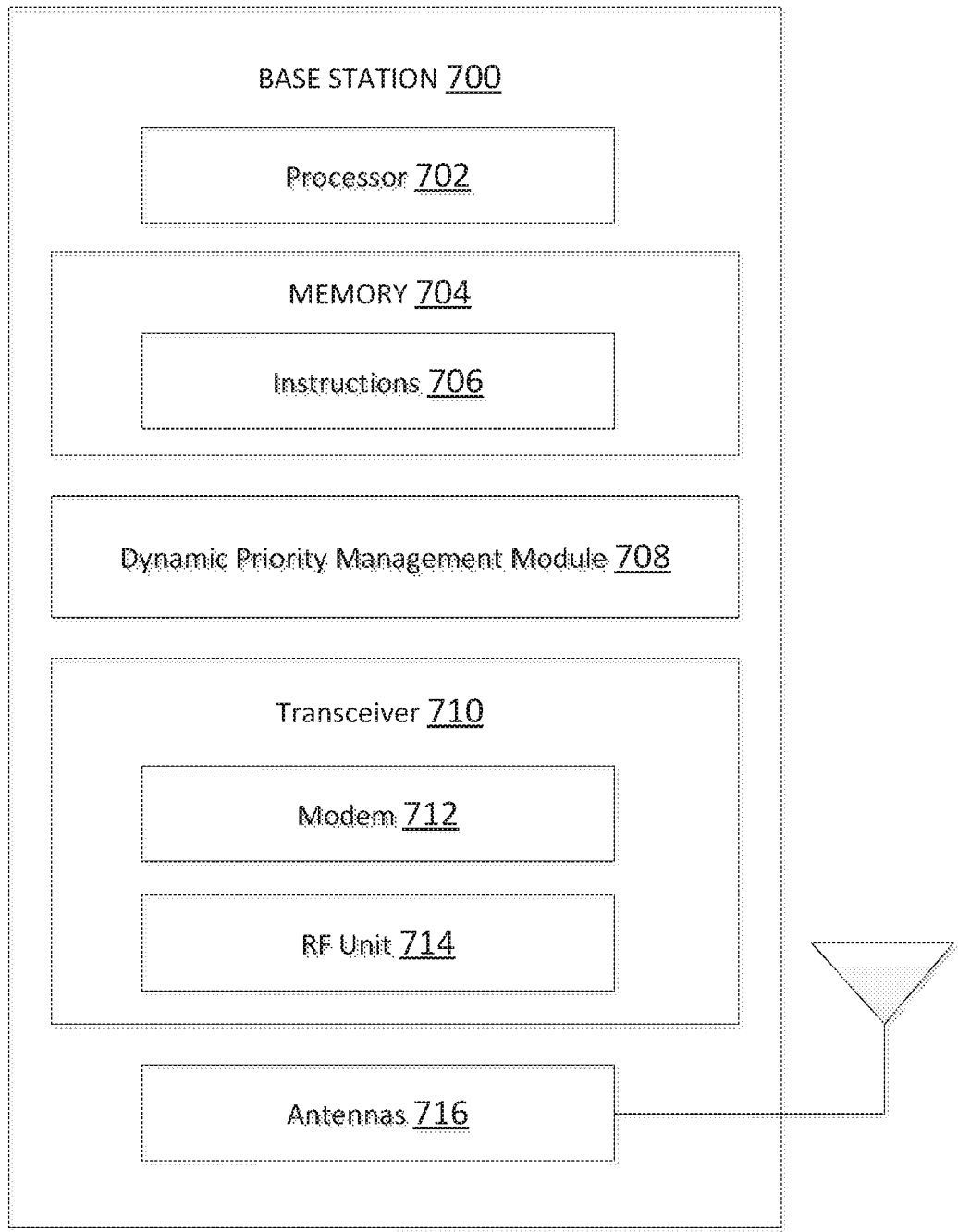
FIG. 7 is a block diagram of an exemplary base station (BS) according to embodiments of the present disclosure.

FIG. 7 is a block diagram of an exemplary BS 700 according to embodiments of the present disclosure. The BS 700 may be a BS 105 or 205 as discussed above. A shown, the BS 700 may include a processor 702, a memory 704, a dynamic priority management module 708, a transceiver 710 including a modem subsystem 712 and a RF unit 714, and an antenna 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 7.

The dynamic priority management module 708 may be used for various aspects of the present disclosure. For example, the dynamic priority management module 708 is configured to request spectrum access priority (e.g., based on QoS and scheduling requirements), obtain dynamic priority information, identify transmission opportunities in a shared spectrum based on the dynamic priority information, transmit dynamic priority information, perform network listening, and reserve time periods for using the shared spectrum, as described in greater detail herein.

As shown, the transceiver 710 may include the modem subsystem 712 and the RF unit 714. The transceiver 710 can be configured to communicate bi-directionally with other devices, such as the UEs 115 and 215 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 215. The RF unit 714 may be further configured to perform analog beamforming in conjunction with the digital beamforming. Although shown as integrated together in transceiver 710, the modem subsystem 712 and the RF unit 714 may be separate devices that are coupled together at the BS 205 to enable the BS 205 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of information to complete attachment to a network and communication with a camped UE 215 according to embodiments of the present disclosure. The antenna 716 may further receive data messages transmitted from other devices and provide the received data messages for processing and/or demodulation at the transceiver 710. Although FIG. 7 illustrates antenna 716 as a single antenna, antenna 716 may include multiple antennas of similar or different designs in order to sustain multiple transmission links.

Figure 8:
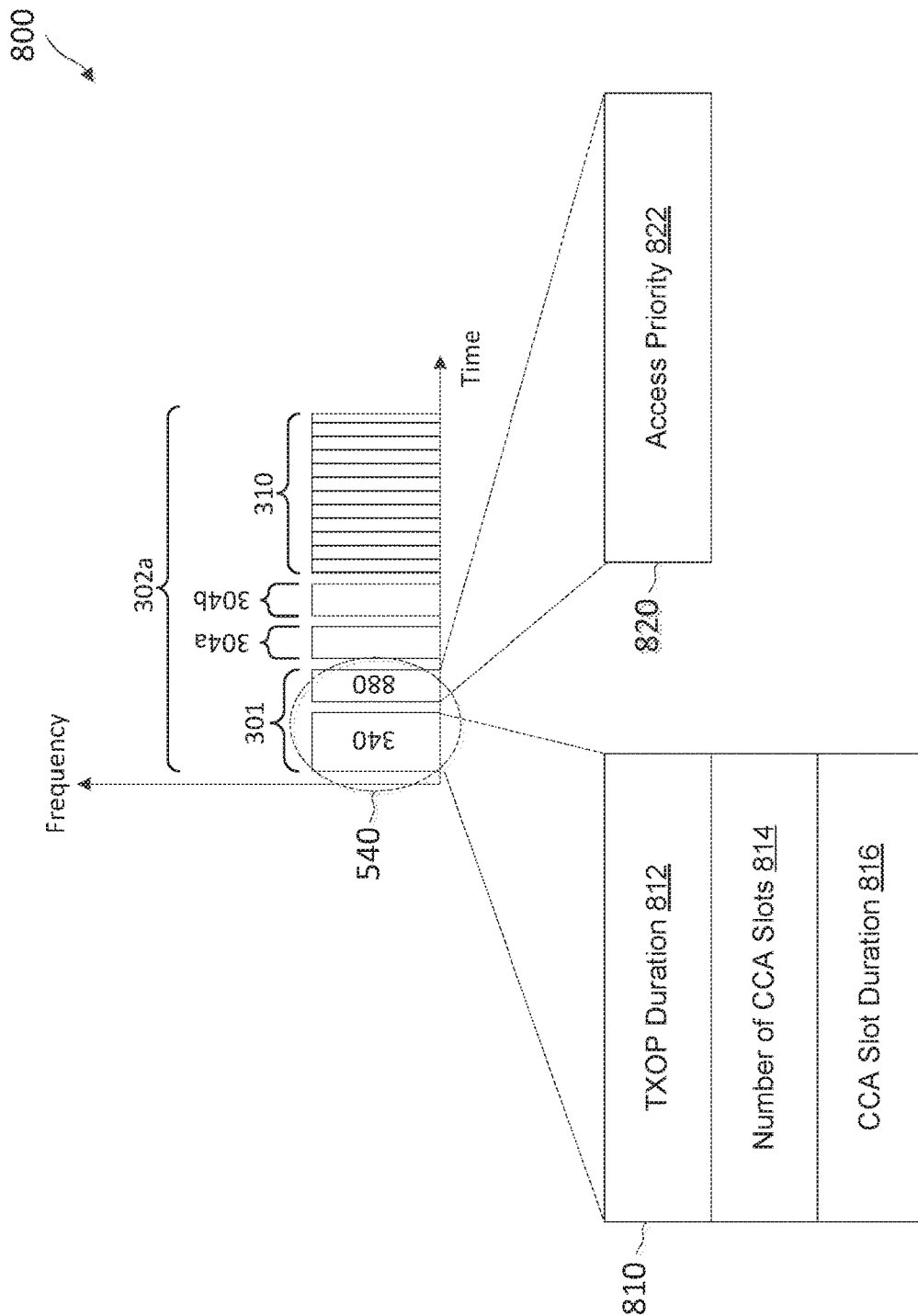
FIG. 8 illustrates a dynamic priority information signaling scheme according to embodiments of the present disclosure.

FIG. 8 illustrates a dynamic priority information signaling scheme 800 according to embodiments of the present disclosure. The scheme 800 may be employed by the BSs 105 and 205 and the UEs 115 and 215 to access a shared spectrum. The scheme 800 may be used in conjunction with the scheme 500 to explicitly indicate dynamic priority information in the acquisition period 301. For example, the BS 205a may transmit a dynamic priority information signal 540 including a TXOP configuration signal 340 and a priority signal 880. The TXOP configuration signal 340 may include a message 810. The priority signal 880 may include a message 820.

The message 810 may include a TXOP duration field 812, a number of CCA period filed 814, and a CCA period duration field 816. The TXOP duration field 812 may indicate a duration of the TXOP 302, for example, in units of OFDM symbols, subframes, slots, or any suitable time format. The number of CCA period filed 814 may indicate a number of CCA periods 304 in the TXOP 302. The CCA period duration field 816 may include a duration of each CCA period 304, for example, in units of OFDM symbols, subframes, slots, or any suitable time format.

The message 820 may include an access priority field 822. The access priority field 822 may indicate an access priority assigned to an operator of the transmitting BS. Thus, when the UE 215a receives the dynamic priority information signal 540, the UE 215a can decode the message 810 to obtain the configuration of the TXOP 302 and decode the message 820 to obtain the access priority of the BS 205a or Operator A.

In an embodiment, nodes of the same operator or the same power class may use the same time-frequency resource in the acquisition period 301 to signal the message 810, while nodes of different operators or power classes may use different time-frequency resources in the acquisition period 301 to signal the message 810 via time-division multiplexing (TDM) and/or frequency-division multiplexing (FDM). For example, nodes of an operator or power class (e.g., the macro cell 240) may use one set of time-frequency resources in the acquisition period 301 and nodes of another operator or power class (e.g., the pico cell 245) may use another set of time-frequency resources in the acquisition period 301. In such an embodiment, a UE may decode a corresponding access priority from a corresponding set of time-frequency resources in the acquisition period 301. The UE may monitor for scheduling information from a corresponding BS in a CCA period 304 corresponding to the decoded access priority. If the UE fails to decode the access priority from the priority signal 880, the UE may operate based on the configuration decoded from the TXOP configuration signal 340.

Figure 9:
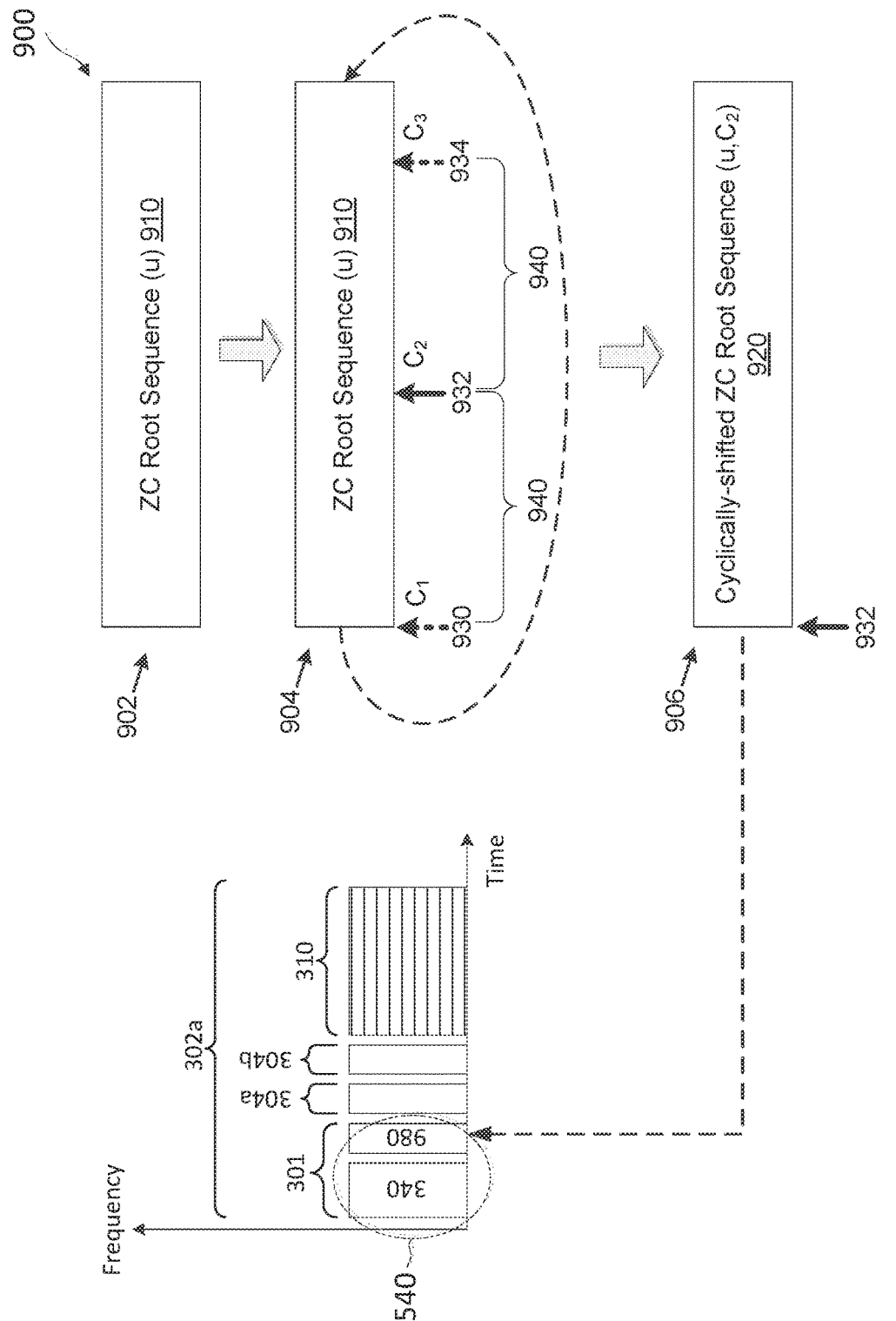
FIG. 9 illustrates a dynamic priority information signaling scheme according to embodiments of the present disclosure.
Figure 10:
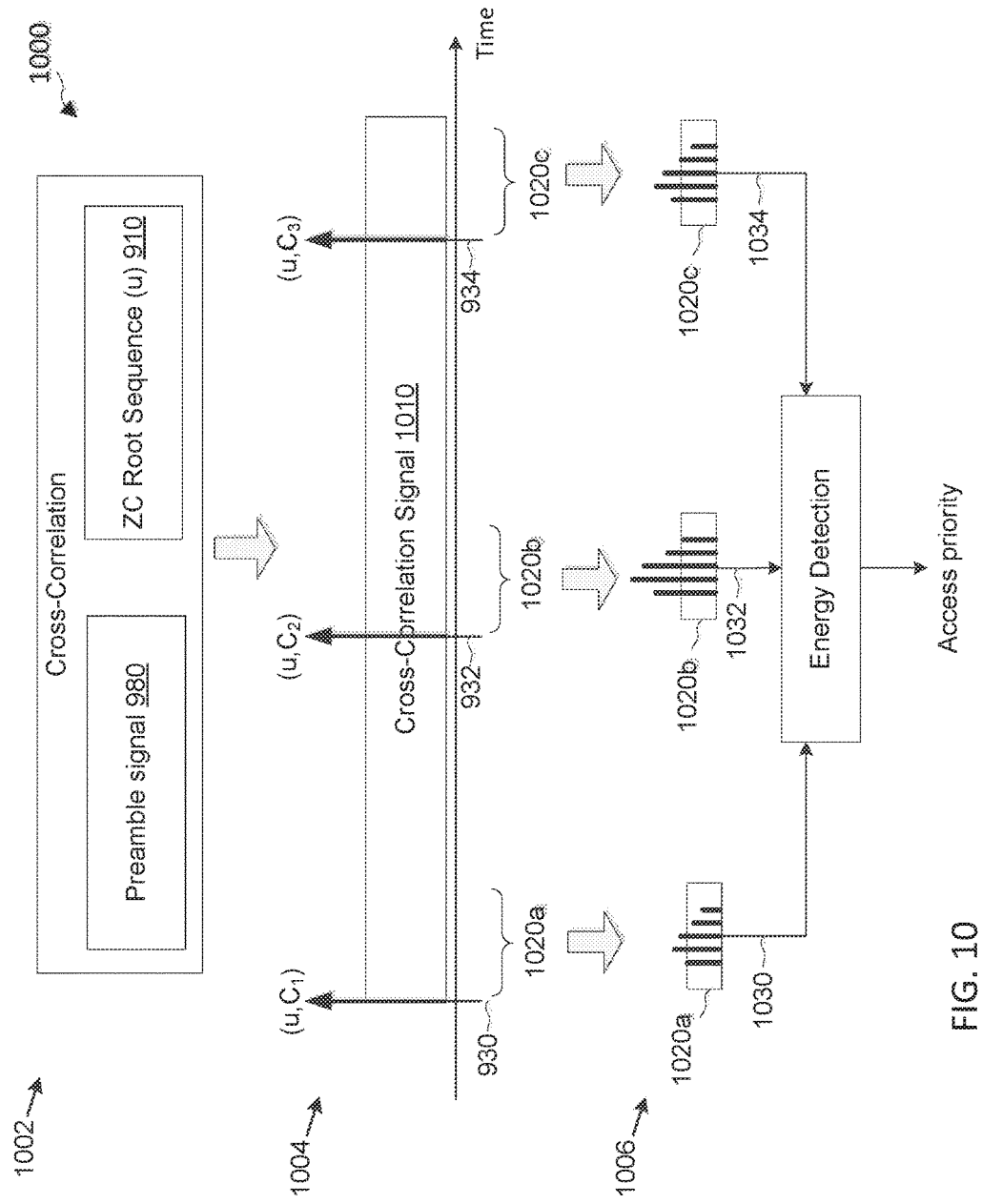
FIG. 10 illustrates a dynamic priority information decoding scheme according to embodiments of the present disclosure.
Figure 11:
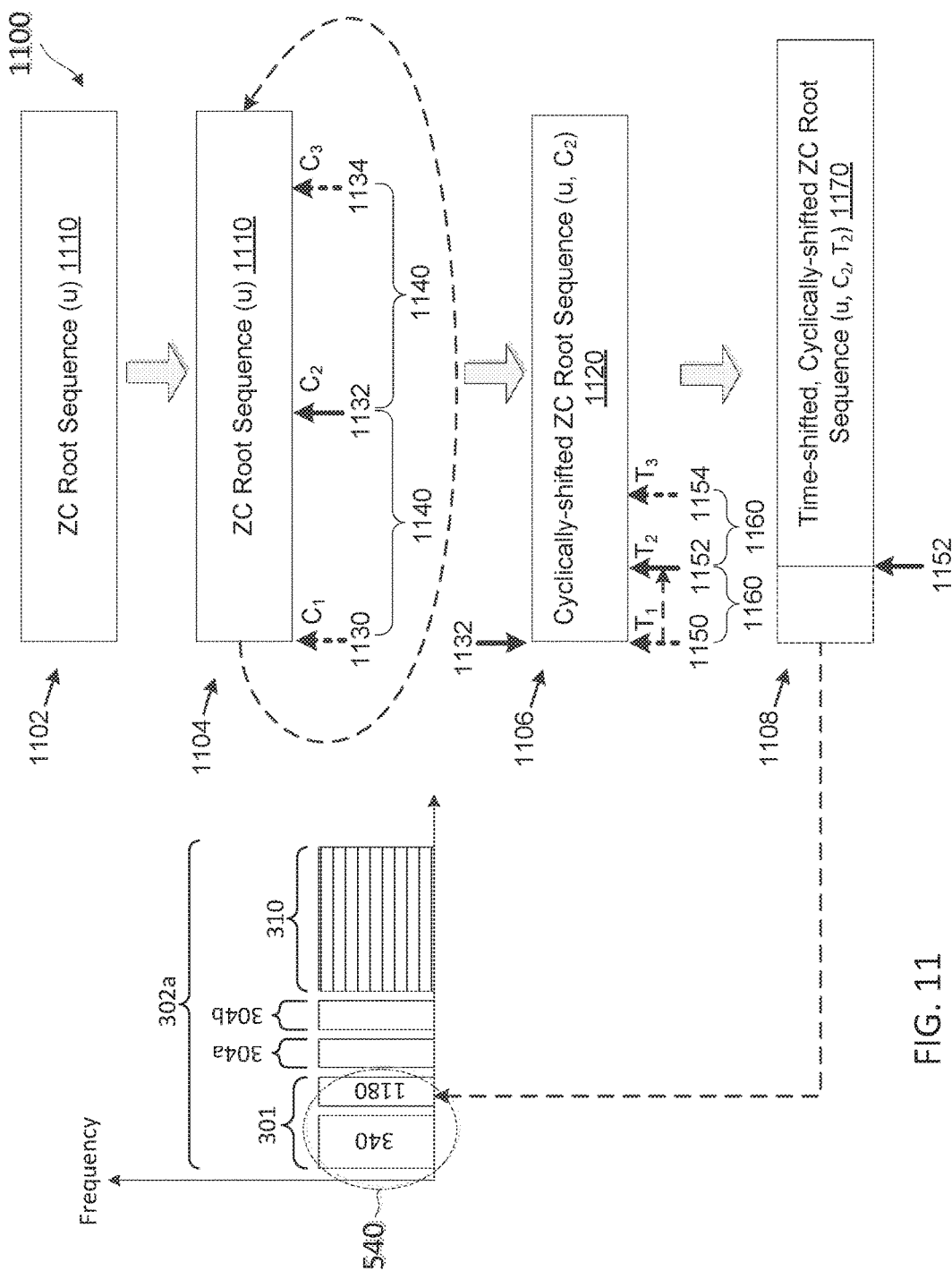
FIG. 11 illustrates a dynamic priority information signaling scheme according to embodiments of the present disclosure.
Figure 12:
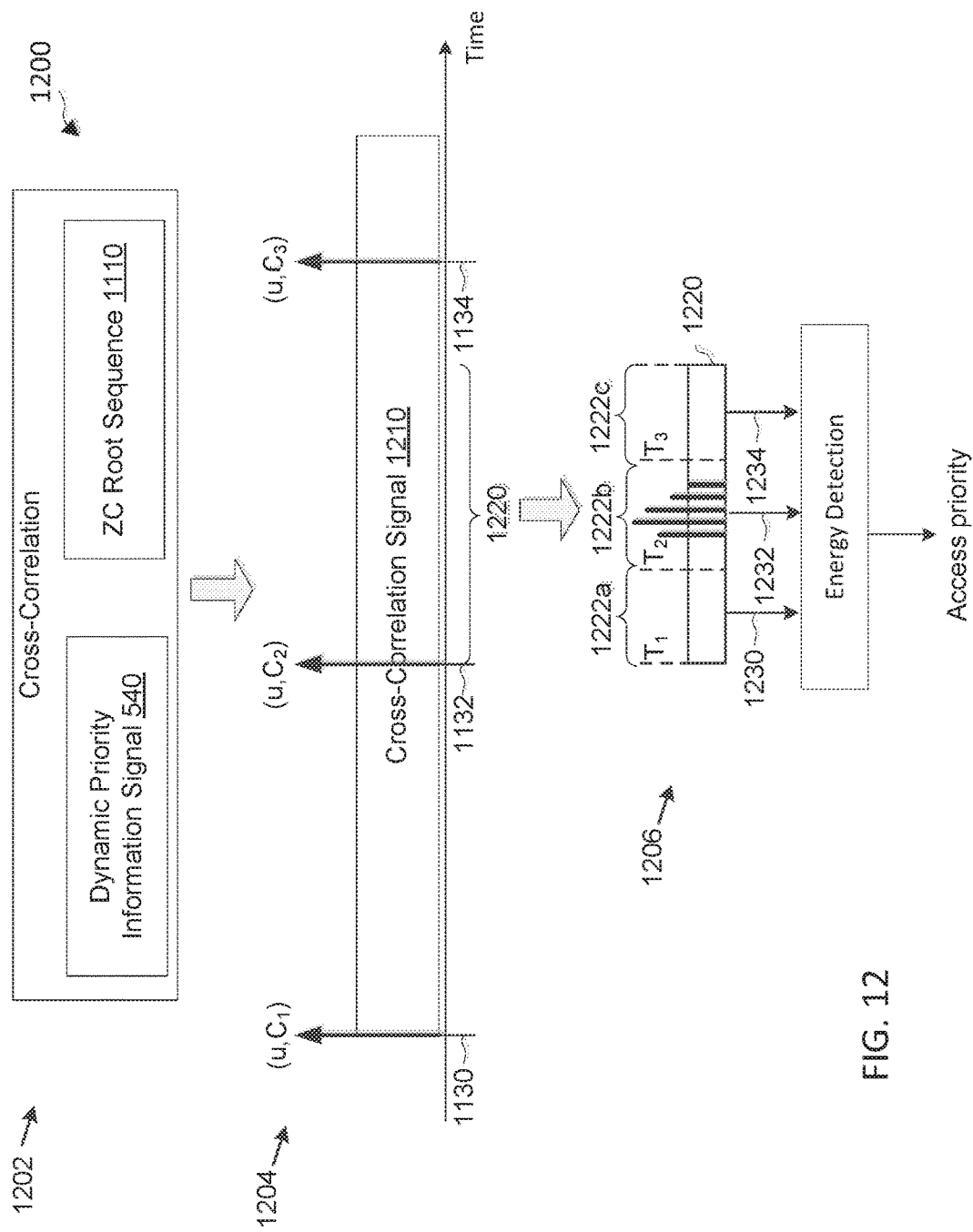
FIG. 12 illustrates a dynamic priority information decoding scheme according to embodiments of the present disclosure.

FIGS. 9-12 illustrate the use of cyclically-shifted preamble sequences to indicate access priorities. FIGS. 9 and 10 associate access priorities with cyclic shifts. FIGS. 11 and 12 associate operators with cyclic shifts and access priorities with timing offsets. FIG. 9 illustrates a dynamic priority information signaling scheme 900 according to embodiments of the present disclosure. The scheme 900 may be employed by the BSs 105 and 205. The scheme 900 may be used in conjunction with the scheme 500 to indicate encoded dynamic priority information in the acquisition period 301. In the scheme 900, the dynamic priority information signal 540 includes a TXOP configuration signal 340 and an additional preamble signal 980 indicating an access priority. The TXOP configuration signal 340 can carry the message 810. The preamble signal 980 is a narrowband signal carrying a common preamble sequence indicating an access priority of a transmitting BS or operator.

In an embodiment, the preamble sequence is a Zadoff-Chu (ZC) sequence. A ZC sequence is a complex-valued sequence generated from a ZC root sequence of a particular root index. Cyclically-shifted versions of a ZC root sequence are orthogonal to each other. In the scheme 900, priority orders are indicated through placements or positions of cyclic shifts. In some embodiments, BSs or operators with different power classes may be assigned with different root indices. Within the same power class, BSs or operators with different priorities can be assigned with the same root index, but different cyclic shifts. As an example, Operators B, A, and C are assigned with a root index u and access priorities of 1 (e.g., highest), 2, and 3 (e.g., lowest), respectively, in the TXOP 302. The BS 205a may generate a preamble signal 980 based on the assigned root index and a cyclic shift corresponding to the access priority 2.

For example, at step 902, the BS 205a generates a ZC root sequence 910 based on a root index u assigned to Operator A as shown below:

$$x_u(n) = e^{-j\frac{\pi u n(n+1)}{N_{ZC}}}, \quad (1)$$

where $x_u$ represents a ZC root sequence of root index u, n represents the index of the ZC root sequence, and $N_{ZC}$ represents the length of the ZC sequence $x_u$. The length $N_{ZC}$ can be configured based on coverage areas of the operators and/or tone spacing.

At step 904, the BS 205a selects a cyclic shift corresponding to the access priority 2. For example, cyclic shifts 930, 932, and 934 correspond to the access priorities 1, 2, and 3, respectively. The cyclic shifts 930, 932, and 934 are denoted as $C_1$, $C_2$, and $C_3$, respectively. Thus, the BS 205a may cyclically shifts the ZC root sequence 910 by the cyclic shift 932 corresponding to the access priority 2 to produce a cyclically-shifted ZC root sequence 920. The cyclically-shifted ZC root sequence 920 can be expressed as shown below:

$$x_{um}(n) = x_u(n-C_m), \text{ for } n=0, 1, \ldots, N_{ZC}, \quad (2)$$

where $C_m$ represents the cyclic shift (e.g., the cyclic shift 932) applied by a $m^{th}$ priority operator (e.g., Operator A). The cyclic shifts 930, 932, and 934 may be separated by a separation 940 (e.g., a number of sequence values), denoted as $N_{CS}$. The separation 940 represents the minimum separation between two resolvable cyclic shifts of the same root index. Thus, $C_m$ can be expressed as shown below:

$$C_m = l \times N_{CS}, \quad (3)$$

where l is a positive integer.

At step 906, the BS 205a transmits a preamble signal 980 carrying the cyclically-shifted ZC root sequence 920 in the acquisition period 301. The scheme 900 allows multiple operators (e.g., Operators A, B, and C) to transmit common preamble sequences with different cyclic shifts on the same time-frequency resources.

FIG. 10 illustrates a dynamic priority information decoding scheme 1000 according to embodiments of the present disclosure. The scheme 1000 may be employed by the UEs 115 and 215. The scheme 1000 may be used in conjunction with the schemes 500 and 900. For example, the BS 205a may generate and transmit a preamble signal 980 according to the scheme 900. Upon receiving the preamble signal 980, the UE 215a may employ the scheme 1000 to determine an access priority of the BS 205a or Operator A.

For example, at step 1002, the UE 215a computes a cross-correlation signal 1010 between the received preambles signal 980 and a ZC root sequence (e.g., shown in equation (1)) of a root index u assigned to Operator A. The received preamble signal 980, denoted as y, is shown below:

$$y[n] = h_1[n+C_1-\tau_1] + h_2[n+C_2-\tau_2] + h_3[n+C_3-\tau_3], \quad (4)$$

where $C_1$, $C_2$, and $C_3$ represent the cyclic shifts 930, 932, and 934, respectively. $h_1$, $h_2$, and $h_3$ represent the channel responses of links (e.g., the communication links 125) between the UE 215a and an Operator B BS, the BS 215a, and an Operator C BS, respectively. $\tau_1$, $\tau_2$, and $\tau_3$ represent average timing advances between the UE 215a and an Operator B BS, the BS 215a, and an Operator C BS, respectively.

At step 1004, the UE 215a positions a plurality of search windows 1020 (e.g., uncertainty windows) within the cross-correlation signal 1010, for example, centered based on the cyclic shifts 930, 932, and 934 and the assigned ZC root index. The lengths of the search windows 1020 may be dependent on the round trip delay or propagation delay profile (PDP) of the channels $h_1$, $h_2$, and $h_3$.

At step 1006, the UE 215a computes signal energy 1030, 1032, and 1034 in the search windows 1020a, 1020b, and 1020c, respectively. The UE 215a may apply a predetermined threshold to the signal energy 1030, 1032, and 1034 to determine whether a valid dynamic priority information signal 540 is present at each of the cyclic shifts 930, 932, and 934, respectively. The UE 215a may search for a peak in each search window 1020 to determine a timing advance (e.g., $\tau_1$, $\tau_2$, and $\tau_3$) for each operator. The UE 215a may select a search window 1020 with the maximum energy and determine the access priority of the BS 205a or Operator A based on the placement order of the maximum-energy search window 1020. For example, the BS 205a is assigned with a second highest priority and applied the cyclic shift 932 to the dynamic priority information signal 540. When the UE 215a receives the preamble signal 980, the UE 215a may determine that the search window 1020b has the maximum energy 1032. Thus, the UE 215a may determine that the BS 205a has the second highest priority based on the placement order of the cyclic shift 932.

FIG. 11 illustrates a dynamic priority information signaling scheme 1100 according to embodiments of the present disclosure. The scheme 1100 may be employed by the BSs 105 and 205. The scheme 1100 may be used in conjunction with the scheme 500 to indicate encoded dynamic priority information in the acquisition period 301. The scheme 1100 may be similar to the scheme 900, where a narrowband preamble signal 1180 is transmitted in the acquisition period 301 to indicate an access priority. However, in scheme 1100, cyclic shifts are associated with operators and priority orders are associated with timing offsets. Operators or BSs of different priorities may be assigned with a same root index, but different cyclic shifts. As an example, Operator B, A, and C are assigned with access priorities 1 (e.g., highest), 2, and 3 (e.g., lowest), respectively, in the TXOP 302. The BS 205a may generate a preamble signal 1180 based on a root index and a cyclic shift assigned to Operator A and a timing offset corresponding to the access priority 2.

For example, at step 1102, the BS 205a generates a ZC root sequence 1110 similar to the ZC root sequence 910 shown in equation (1) based on a root index u assigned to Operator A.

At step 1104, the BS 205a selects a cyclic shift assigned to Operator A. For example, cyclic shifts 1130, 1132, and 1134 are assigned to Operators B, A, and C, respectively. The cyclic shifts 1130, 1132, and 1134 are denoted as $C_1$, $C_2$, and $C_3$, respectively. Thus, the BS 205a may cyclically shifts the ZC root sequence 1110 by the cyclic shift 1132 to produce a cyclically-shifted ZC root sequence 1120.

At step 1106, the BS 205a selects a timing offset corresponding to the access priority 2. For example, timing offsets 1150, 1152, and 1154 correspond to access priorities 1, 2, and 3, respectively. The timing offsets 1150, 1152, and 1154 are denoted as $T_1$, $T_2$, and $T_3$, respectively. Thus, the BS 205a may time-shift (e.g., delay) the cyclically-shifted ZC root sequence 1120 by the timing offset 1152 corresponding to the access priority 2 to produce a time-shifted, cyclically-shifted ZC root sequence 1170. The separation 1160 between the timing offsets 1150, 1152, and 1154 may be dependent on the round trip delays and/or channel PDPs between nodes (e.g., the BS 205a and the UE 215a) in a network (e.g., the networks 100 and 200).

At step 1108, the BS 205a transmits a preamble signal 1180 carrying the time-shifted, cyclically-shifted ZC root sequence 1170 in the acquisition period 301. The scheme 1100 allows all operators (e.g., Operators A, B, and C) to transmit a common preamble signal with different cyclic shifts and time-shifts on the same time-frequency resources.

FIG. 12 illustrates a dynamic priority information decoding scheme 1200 according to embodiments of the present disclosure. The scheme 1200 may be employed by the UEs 115 and 215. The scheme 1200 may be used in conjunction with the schemes 500 and 1100. For example, the BS 205a may generate and transmit a preamble signal 1180 according to the scheme 1100. Upon receiving the preamble signal 1180, the UE 215a may employ the scheme 1200 to determine an access priority of the BS 205a or Operator A.

For example, at step 1202, the UE 215a computes a cross-correlation signal 1210 between the received preamble signal 1180 and a ZC root sequence (e.g., shown in equation (1)) of a root index u assigned to Operator A.

At step 1204, the UE 215a positions a search window 1220 within the cross-correlation signal 1210, for example, centered based on a cyclic shift (e.g., the cyclic shift 1132) assigned to Operator A. The search window 1220 includes a plurality of sub-windows 1222 positioned corresponding to the timing offsets 1150, 1152, and 1154. Each sub-window 1222 is mapped to an access priority. Thus, the number of sub-windows 1222 in a search window 1220 may correspond to the number of access priorities in a TXOP 302.

At step 1206, the UE 215a computes signal energy 1230, 1232, and 1234 in the sub-windows 1222a, 1222b, and 1222c, respectively. The UE 215a may select a sub-window 1222 with the maximum energy and determine the access priority of the BS 205a or Operator A based on the placement order of the maximum-energy sub-window 1222. For example, the BS 205a is assigned with a second highest priority and applied the timing offset 1152 to the preamble signal 1180. When the UE 215a receives the preamble signal 1180, the UE 215a may determine that the sub-window 1222b has the maximum energy 1232. Thus, the UE 215a may determine that the BS 205a has the second highest priority based on the placement order of the sub-window 1222.

The schemes 900 and 1000 may have several benefits when compared to the schemes 1100 and 1200. For example, a UE operating in the schemes 900 and 1000 may be required to know the root index of its operator, but not the cyclic shift, while a UE operating in the schemes 1100 and 1200 may be required to know the root index, the cyclic shift of its operator, and the number of access priorities in a TXOP 302. In addition, the cyclic shifts (e.g., the cyclic shifts 1130, 1132, and 1134) in the schemes 1100 and 1200 may require a larger separation than the cyclic shifts (e.g., the cyclic shifts 930, 932, and 934) in the schemes 900 and 1100. In some embodiments, the schemes 1100 and 1200 may require more than one root index to accommodate all the access priorities. In an embodiment, a BS may transmit preamble configuration information to indicate the root index, the cyclic shift, and/or the number of access priorities. Further, a UE operating in the schemes 900 and 1000 may be able to detect the priority orders of other operators. However, the schemes 1100 and 1200 may provide better fading and/or cell-edge performances than the schemes 900 and 1000.

Figure 13:
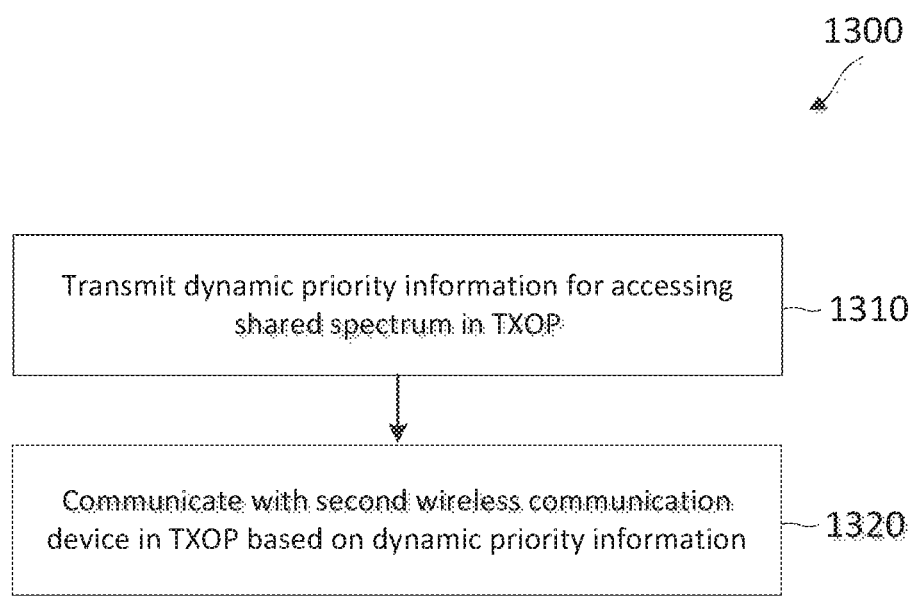
FIG. 13 is a flow diagram of a method of performing spectrum sharing with dynamic priority information signaling according to embodiments of the present disclosure.

FIG. 13 is a flow diagram of a method 1300 of performing spectrum sharing with dynamic priority information signaling according to embodiments of the present disclosure. Steps of the method 1300 can be executed by a computing device (e.g., a processor, processing circuit, and/or other suitable component) of a wireless communication device, such as the BSs 105, 205, and 700. The method 1300 may employ similar mechanisms as in the schemes 500, 800, 900, and 1100 described with respect to FIGS. 5, 8, 9, and 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting dynamic priority information for accessing a shared spectrum in a TXOP (e.g., the TXOP 302). The share spectrum may be shared by a plurality of network operating entities (e.g., Operators A, B, and C). For example, the wireless communication device (e.g., the BS 205a) is associated with a first network operating entity (e.g., Operator A) of the plurality of the network operating entities. In one embodiment, the dynamic priority information may be similar to the message 820. In another embodiment, the dynamic priority information may be indicated in a preamble signal similar to the preamble signals 980 and 1180.

At step 1320, the method 1300 includes communicating with a second wireless communication device (e.g., the UE 215a) associated with the first operator, in the TXOP based on the dynamic priority information.

Figure 14:
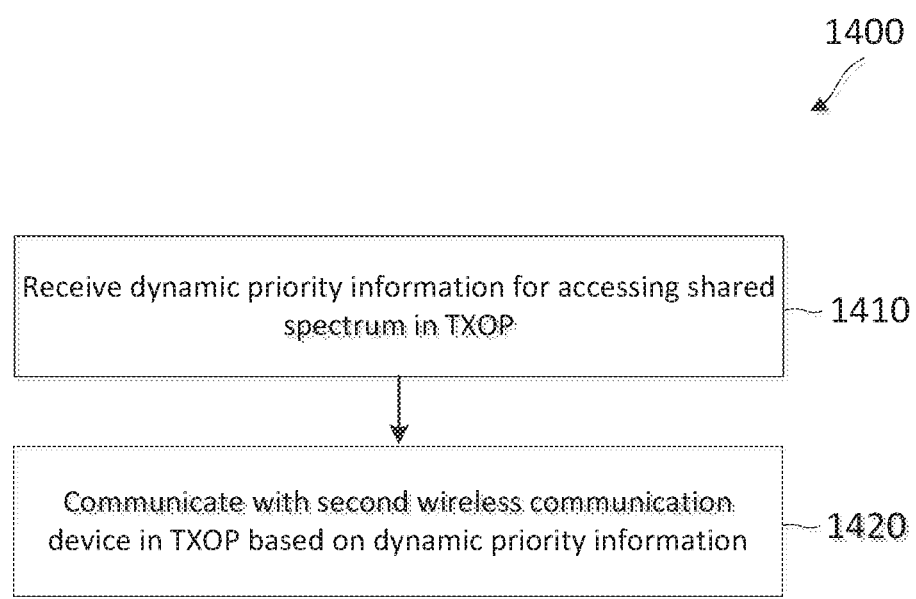
FIG. 14 is a flow diagram of a method of performing spectrum sharing with dynamic priority information signaling according to embodiments of the present disclosure.

FIG. 14 is a flow diagram of a method 1400 of performing spectrum sharing with dynamic priority information decoding according to embodiments of the present disclosure. Steps of the method 1400 can be executed by a computing device (e.g., a processor, processing circuit, and/or other suitable component) of a wireless communication device, such as the UEs 115, 215, and 600. The method 1400 may employ similar mechanisms as in the schemes 500, 800, 1000, and 1200 described with respect to FIGS. 5, 8, 10, and 12, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving dynamic priority information for accessing a shared spectrum in a TXOP (e.g., the TXOP 302). The share spectrum may be shared by a plurality of network operating entities (e.g., Operators A, B, and C). For example, the wireless communication device (e.g., the UE 215a) is associated with a first network operating entity (e.g., Operator A) of the plurality of the network operating entities and the dynamic priority information is received from a second wireless communication device (e.g., the BS 205a) of the first network operating entity. In one embodiment, the dynamic priority information may be similar to the message 820. In another embodiment, the dynamic priority information may be indicated in a preamble signal similar to the preamble signals 980 and 1180.

At step 1420, the method 1400 includes communicating with the second wireless communication device (e.g., the UE 215a) associated with the first operator, in the TXOP based on the dynamic priority information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising transmitting, by a first wireless communication device associated with a first network operating entity of a plurality of network operating entities, dynamic priority information for accessing a shared spectrum in a transmission opportunity (TXOP), wherein the shared spectrum is shared by the plurality of network operating entities, and wherein the dynamic priority information indicates an access priority of the first network operating entity in the TXOP; and communicating, by the first wireless communication device, with a second wireless communication device associated with the first network operating entity in the TXOP based on the dynamic priority information.

In some embodiments, wherein the TXOP includes an acquisition period, a plurality of priority-based channel sensing periods, and a transmission period. In some embodiments, wherein the dynamic priority information is transmitted in the acquisition period. In some embodiments, wherein the communicating includes transmitting, in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing periods. In some embodiments, wherein the transmitting the dynamic priority information includes transmitting a cyclically-shifted preamble sequence based on the access priority of the first network operating entity. In some embodiments, wherein the cyclically-shifted preamble sequence is a Zaddoff-Chu (ZC) root sequence cyclically shifted by a cyclic shift value associated with the access priority of the first network operating entity. In some embodiments, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity. In some embodiments, wherein the cyclically-shifted preamble sequence is a Zadoff-Chu (ZC) sequence, and wherein the method further comprises transmitting, by the first wireless communication device, preamble configuration information indicating at least one of a root index of the ZC sequence, a cyclic shift value of the cyclically-shifted preamble sequence, or a number of access priorities in the TXOP.

Further embodiments of the present disclosure include a method of wireless communication, comprising receiving, by a first wireless communication device from a second wireless communication device, dynamic priority information for accessing a shared spectrum in a transmission opportunity (TXOP), wherein the shared spectrum is shared by a plurality of network operating entities, and wherein the first wireless communication device and the second wireless communication device are associated with a first network operating entity of the plurality of network operating entities, wherein the dynamic priority information indicates an access priority of the first network operating entity in the TXOP; and communicating, by the first wireless communication device, with the second wireless communication device based on the dynamic priority information.

In some embodiments, wherein the TXOP includes an acquisition period, a plurality of priority-based channel sensing periods, and a transmission period. In some embodiments, wherein the dynamic priority information is received in the acquisition period. In some embodiments, wherein the communicating includes receiving, from the second wireless communication device in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing period. In some embodiments, wherein the receiving the dynamic priority information includes receiving a preamble signal carrying a cyclically-shifted preamble sequence indicating the access priority of the first network operating entity in the TXOP. In some embodiments, wherein the cyclically-shifted preamble sequence is a Zadoff-Chu (ZC) sequence. In some embodiments, the method further comprises determining, by the first wireless communication device, a cross-correlation signal between the preamble signal and a ZC root sequence; and identifying, by the first wireless communication device, the access priority of the first network operating entity based on energy detection over a plurality of search windows within the cross-correlation signal, wherein the plurality of search windows are positioned based on a plurality of cyclic shifts corresponding to access priorities in the TXOP. In some embodiments, the method further comprises determining, by the first wireless communication device, a cross-correlation signal between the preamble signal and a ZC root sequence; and identifying, by the first wireless communication device, the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP. In some embodiments, the method further comprises receiving, by the first wireless communication device from the second wireless communication device, preamble configuration information indicating at least one of a root index of the ZC sequence, a cyclic shift of the cyclically-shifted preamble sequence, or a number of access priorities in the TXOP.

Further embodiments of the present disclosure include an apparatus comprising a transmitter configured to transmit dynamic priority information for accessing a shared spectrum in a transmission opportunity (TXOP), wherein the shared spectrum is shared by a plurality of network operating entities, wherein the apparatus is associated with a first network operating entity of the plurality of network operating entities, and wherein the dynamic priority information indicates an access priority of the first network operating entity in the TXOP; and a processor configured to communicate with a wireless communication device associated with the first network operating entity in the TXOP based on the dynamic priority information.

In some embodiments, wherein the TXOP includes an acquisition period, a plurality of priority-based channel sensing periods, and a transmission period. In some embodiments, wherein the dynamic priority information is transmitted in the acquisition period. In some embodiments, wherein the processor is further configured to communicating with the wireless communication device by transmitting, via the transmitter in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing periods. In some embodiments, wherein the transmitter is further configured to transmit the dynamic priority information by transmitting a cyclically-shifted preamble sequence based on the access priority of the first network operating entity. In some embodiments, wherein the cyclically-shifted preamble sequence is a Zaddoff-Chu (ZC) root sequence cyclically shifted by a cyclic shift value associated with the access priority of the first network operating entity. In some embodiments, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity. In some embodiments, wherein the cyclically-shifted preamble sequence is a Zadoff-Chu (ZC) sequence, and wherein the transmitter is further configured to transmit preamble configuration information indicating at least one of a root index of the ZC sequence, a cyclic shift value of the cyclically-shifted preamble sequence, or a number of access priorities in the TXOP.

Further embodiments of the present disclosure include an apparatus comprising a receiver configured to receive, from a wireless communication device, dynamic priority information for accessing a shared spectrum in a transmission opportunity (TXOP), wherein the shared spectrum is shared by a plurality of network operating entities, and wherein the apparatus and the wireless communication device are associated with a first network operating entity of the plurality of network operating entities, wherein the dynamic priority information indicates an access priority of the first network operating entity in the TXOP; and a processor configured to communicate with the wireless communication device based on the dynamic priority information.

In some embodiments, wherein the TXOP includes an acquisition period, a plurality of priority-based channel sensing periods, and a transmission period. In some embodiments, wherein the dynamic priority information is received in the acquisition period. In some embodiments, wherein the processor is further configured to communicate with the wireless communication device by receiving, via the receiver from the wireless communication device in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing period. In some embodiments, wherein the receiver is further configured to receive the dynamic priority information by receiving a preamble signal carrying a cyclically-shifted preamble sequence indicating the access priority of the first network operating entity in the TXOP. In some embodiments, wherein the cyclically-shifted preamble sequence is a Zadoff-Chu (ZC) sequence. In some embodiments, wherein the processor is further configured to determine a cross-correlation signal between the preamble signal and a ZC root sequence; and identify the access priority of the first network operating entity based on energy detection over a plurality of search windows within the cross-correlation signal, wherein the plurality of search windows are positioned based on a plurality of cyclic shifts corresponding to access priorities in the TXOP. In some embodiments, wherein the processor is further configured to determine a cross-correlation signal between the preamble signal and a ZC root sequence; and identify the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP. In some embodiments, wherein the receiver is further configured to receive, from the wireless communication device, preamble configuration information indicating at least one of a root index of the ZC sequence, a cyclic shift of the cyclically-shifted preamble sequence, or a number of access priorities in the TXOP.

Further embodiments of the present disclosure include a computer-readable medium having program code recorded thereon, the program code comprising code for causing a first wireless communication device to transmit dynamic priority information for accessing a shared spectrum in a transmission opportunity (TXOP), wherein the shared spectrum is shared by a plurality of network operating entities, wherein the first wireless communication device is associated with a first network operating entity of the plurality of network operating entities, and wherein the dynamic priority information indicates an access priority of the first network operating entity in the TXOP; and code for causing the first wireless communication device to communicate with a second wireless communication device associated with the first network operating entity in the TXOP based on the dynamic priority information.

In some embodiments, wherein the TXOP includes an acquisition period, a plurality of priority-based channel sensing periods, and a transmission period. In some embodiments, wherein the dynamic priority information is transmitted in the acquisition period. In some embodiments, wherein the code for communicating is further configured to transmit, in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing periods. In some embodiments, wherein the code for transmitting the dynamic priority information is further configured to transmit a cyclically-shifted preamble sequence based on the access priority of the first network operating entity. In some embodiments, wherein the cyclically-shifted preamble sequence is a Zaddoff-Chu (ZC) root sequence cyclically shifted by a cyclic shift value associated with the access priority of the first network operating entity. In some embodiments, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity. In some embodiments, wherein the cyclically-shifted preamble sequence is a Zadoff-Chu (ZC) sequence, and wherein the computer-readable medium further comprises code for causing the first wireless communication device to transmit preamble configuration information indicating at least one of a root index of the ZC sequence, a cyclic shift value of the cyclically-shifted preamble sequence, or a number of access priorities in the TXOP.

Further embodiments of the present disclosure include a computer-readable medium having program code recorded thereon, the program code comprising code for causing a first wireless communication device to receive from a second wireless communication device, dynamic priority information for accessing a shared spectrum in a transmission opportunity (TXOP), wherein the shared spectrum is shared by a plurality of network operating entities, and wherein the first wireless communication device and the second wireless communication device are associated with a first network operating entity of the plurality of network operating entities, wherein the dynamic priority information indicates an access priority of the first network operating entity in the TXOP; and code for causing a first wireless communication device to communicate with the second wireless communication device based on the dynamic priority information.

In some embodiments, wherein the TXOP includes an acquisition period, a plurality of priority-based channel sensing periods, and a transmission period. In some embodiments, wherein the dynamic priority information is received in the acquisition period. In some embodiments, wherein the code for communicating is further configured to receive, from the second wireless communication device in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing period. In some embodiments, wherein the code for receiving the dynamic priority information is further configured to receive a preamble signal carrying a cyclically-shifted preamble sequence indicating the access priority of the first network operating entity in the TXOP. In some embodiments, wherein the cyclically-shifted preamble sequence is a Zadoff-Chu (ZC) sequence. In some embodiments, the computer-readable medium further comprises code for causing a first wireless communication device to determine a cross-correlation signal between the preamble signal and a ZC root sequence; and code for causing a first wireless communication device to identify the access priority of the first network operating entity based on energy detection over a plurality of search windows within the cross-correlation signal, wherein the plurality of search windows are positioned based on a plurality of cyclic shifts corresponding to access priorities in the TXOP. In some embodiments, the computer-readable medium further comprises code for causing a first wireless communication device to determine a cross-correlation signal between the preamble signal and a ZC root sequence; and code for causing a first wireless communication device to identify the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP. In some embodiments, the computer-readable medium further comprises code for causing a first wireless communication device to receive, from the second wireless communication device, preamble configuration information indicating at least one of a root index of the ZC sequence, a cyclic shift of the cyclically-shifted preamble sequence, or a number of access priorities in the TXOP.

Further embodiments of the present disclosure include an apparatus comprising means for transmitting dynamic priority information for accessing a shared spectrum in a transmission opportunity (TXOP), wherein the shared spectrum is shared by a plurality of network operating entities, wherein the apparatus is associated with a first network operating entity of the plurality of network operating entities, and wherein the dynamic priority information indicates an access priority of the first network operating entity in the TXOP; and means for communicating with a wireless communication device associated with the first network operating entity in the TXOP based on the dynamic priority information.

In some embodiments, wherein the TXOP includes an acquisition period, a plurality of priority-based channel sensing periods, and a transmission period. In some embodiments, wherein the dynamic priority information is transmitted in the acquisition period. In some embodiments, wherein the means for communicating with the communication device is further configured to transmit, in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing periods. In some embodiments, wherein the means for transmitting the dynamic priority information is further configured to transmit a cyclically-shifted preamble sequence based on the access priority of the first network operating entity. In some embodiments, wherein the cyclically-shifted preamble sequence is a Zaddoff-Chu (ZC) root sequence cyclically shifted by a cyclic shift value associated with the access priority of the first network operating entity. In some embodiments, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity. In some embodiments, wherein the cyclically-shifted preamble sequence is a Zadoff-Chu (ZC) sequence, and wherein the apparatus further comprises means for transmitting preamble configuration information indicating at least one of a root index of the ZC sequence, a cyclic shift value of the cyclically-shifted preamble sequence, or a number of access priorities in the TXOP.

Further embodiments of the present disclosure include an apparatus comprising means for receiving, from a wireless communication device, dynamic priority information for accessing a shared spectrum in a transmission opportunity (TXOP), wherein the shared spectrum is shared by a plurality of network operating entities, and wherein the apparatus and the wireless communication device are associated with a first network operating entity of the plurality of network operating entities, wherein the dynamic priority information indicates an access priority of the first network operating entity in the TXOP; and means for communicating with the wireless communication device based on the dynamic priority information.

In some embodiments, wherein the TXOP includes an acquisition period, a plurality of priority-based channel sensing periods, and a transmission period. In some embodiments, wherein the dynamic priority information is received in the acquisition period. In some embodiments, wherein the means for communicating with the wireless communication device is further configured to receive, from the wireless communication device in a first channel sensing period of the plurality of priority-based channel sensing periods corresponding to the access priority of the first network operating entity, a reservation for the shared spectrum in the transmission period. In some embodiments, wherein the dynamic priority information further indicates at least one of a duration of the TXOP, a number of the plurality of priority-based channel sensing periods in the TXOP, or a duration of each of the plurality of priority-based channel sensing period. In some embodiments, wherein the means for receiving the dynamic priority information is further configured to receive a preamble signal carrying a cyclically-shifted preamble sequence indicating the access priority of the first network operating entity in the TXOP. In some embodiments, wherein the cyclically-shifted preamble sequence is a Zadoff-Chu (ZC) sequence. In some embodiments, the apparatus further comprises means for determining a cross-correlation signal between the preamble signal and a ZC root sequence; and means for identifying the access priority of the first network operating entity based on energy detection over a plurality of search windows within the cross-correlation signal, wherein the plurality of search windows are positioned based on a plurality of cyclic shifts corresponding to access priorities in the TXOP. In some embodiments, the apparatus further comprises means for determining a cross-correlation signal between the preamble signal and a ZC root sequence; and means for identifying the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP. In some embodiments, the apparatus further comprises means for receiving, from the wireless communication device, preamble configuration information indicating at least one of a root index of the ZC sequence, a cyclic shift of the cyclically-shifted preamble sequence, or a number of access priorities in the TXOP.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a first wireless communication device associated with a first network operating entity of a plurality of network operating entities, dynamic priority information for accessing a shared spectrum in a transmission opportunity (TXOP), wherein the shared spectrum is shared by the plurality of network operating entities, wherein the dynamic priority information indicates an access priority of the first network operating entity among the plurality of network operating entities in the TXOP, and wherein the TXOP includes a plurality of priority-based channel sensing periods and a transmission period; and
communicating, by the first wireless communication device, with a second wireless communication device associated with the first network operating entity during a first channel sensing period of the plurality of priority-based channel sensing periods in the TXOP corresponding to the access priority of the first network operating entity based on the dynamic priority information, a reservation for the shared spectrum in the transmission period of the TXOP.

2. The method of claim 1, wherein the TXOP further includes an acquisition period, and wherein the dynamic priority information is transmitted during the acquisition period.

3. The method of claim 1, wherein the communicating includes transmitting, by the first wireless communication device to the second wireless communication device during the first channel sensing period of the plurality of priority-based channel sensing periods corresponding to the access priority of the first network operating entity, the reservation for the shared spectrum in the transmission period.

4. The method of claim 1, wherein the dynamic priority information further indicates at least one of a duration of the TXOP, a number of the plurality of priority-based channel sensing periods in the TXOP, or a duration of each of the plurality of priority-based channel sensing periods.

5. The method of claim 1, wherein the transmitting the dynamic priority information includes transmitting a cyclically-shifted preamble sequence based on the access priority of the first network operating entity.

6. The method of claim 5, wherein the cyclically-shifted preamble sequence is a Zaddoff-Chu (ZC) root sequence cyclically shifted by a cyclic shift value associated with the access priority of the first network operating entity.

7. The method of claim 5, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity.

8. A method of wireless communication, comprising:
receiving, by a first wireless communication device from a second wireless communication device, dynamic priority information for accessing a shared spectrum in a transmission opportunity (TXOP), wherein the shared spectrum is shared by a plurality of network operating entities, wherein the first wireless communication device and the second wireless communication device are associated with a first network operating entity of the plurality of network operating entities, wherein the dynamic priority information indicates an access priority of the first network operating entity among the plurality of network operating entities in the TXOP, and wherein the TXOP includes a plurality of priority-based channel sensing periods and a transmission period; and
communicating, by the first wireless communication device, with the second wireless communication device during a first channel sensing period of the plurality of priority-based channel sensing periods in the TXOP corresponding to the access priority of the first network operating entity based on the dynamic priority information, a reservation for the shared spectrum in the transmission period of the TXOP.

9. The method of claim 8, wherein the TXOP further includes an acquisition period, and wherein the dynamic priority information is received in the acquisition period.

10. The method of claim 8, wherein the communicating includes receiving, from the second wireless communication device during the first channel sensing period of the plurality of priority-based channel sensing periods corresponding to the access priority of the first network operating entity, the reservation for the shared spectrum in the transmission period.

11. The method of claim 8, wherein the dynamic priority information further indicates at least one of a duration of the TXOP, a number of the plurality of priority-based channel sensing periods in the TXOP, or a duration of each of the plurality of priority-based channel sensing period.

12. The method of claim 8, wherein the receiving the dynamic priority information includes receiving a preamble signal carrying a cyclically-shifted preamble sequence indicating the access priority of the first network operating entity in the TXOP.

13. The method of claim 12, wherein the cyclically-shifted preamble sequence is a Zadoff-Chu (ZC) sequence.

14. The method of claim 13, further comprising:
determining, by the first wireless communication device, a cross-correlation signal between the preamble signal and a ZC root sequence; and
identifying, by the first wireless communication device, the access priority of the first network operating entity based on energy detection over a plurality of search windows within the cross-correlation signal, wherein the plurality of search windows are positioned based on a plurality of cyclic shifts corresponding to access priorities in the TXOP.

15. The method of claim 13, further comprising:
determining, by the first wireless communication device, a cross-correlation signal between the preamble signal and a ZC root sequence; and
identifying, by the first wireless communication device, the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP.

16. An apparatus comprising:
a transceiver configured to:
transmit dynamic priority information for accessing a shared spectrum in a transmission opportunity (TXOP), wherein the shared spectrum is shared by a plurality of network operating entities, wherein the apparatus is associated with a first network operating entity of the plurality of network operating entities, wherein the dynamic priority information indicates an access priority of the first network operating entity among the plurality of network operating entities in the TXOP, and wherein the TXOP includes a plurality of priority-based channel sensing periods and a transmission period; and communicate with a wireless communication device associated with the first network operating entity during a first channel sensing period of the plurality of priority-based channel sensing periods in the TXOP corresponding to the access priority of the first network operating entity based on the dynamic priority information, a reservation for the shared spectrum in the transmission period of the TXOP.

17. The apparatus of claim 16, wherein the TXOP further includes an acquisition period and wherein the dynamic priority information is transmitted during the acquisition period.

18. The apparatus of claim 16, wherein the transceiver is further configured to communicate the reservation with the wireless communication device by transmitting, to the wireless communication device during the first channel sensing period of the plurality of priority-based channel sensing periods corresponding to the access priority of the first network operating entity, the reservation for the shared spectrum in the transmission period.

19. The apparatus of claim 16, wherein the dynamic priority information further indicates at least one of a duration of the TXOP, a number of the plurality of priority-based channel sensing periods in the TXOP, or a duration of each of the plurality of priority-based channel sensing periods.

20. The apparatus of claim 16, wherein the transceiver is further configured to transmit the dynamic priority information by transmitting a cyclically-shifted preamble sequence based on the access priority of the first network operating entity.

21. The apparatus of claim 20, wherein the cyclically-shifted preamble sequence is a Zaddoff-Chu (ZC) root sequence cyclically shifted by a cyclic shift value associated with the access priority of the first network operating entity.

22. The apparatus of claim 20, wherein the cyclically-shifted preamble sequence is a Zaddoff-Chu (ZC) root sequence cyclically shifted by a cyclic shift value associated with the first network operating entity and time-shifted by a timing offset associated with the access priority of the first network operating entity.

23. An apparatus comprising:
a transceiver configured to:
receive, from a wireless communication device, dynamic priority information for accessing a shared spectrum in a transmission opportunity (TXOP), wherein the shared spectrum is shared by a plurality of network operating entities, wherein the apparatus and the wireless communication device are associated with a first network operating entity of the plurality of network operating entities, wherein the dynamic priority information indicates an access priority of the first network operating entity among the plurality of network operating entities in the TXOP, and wherein the TXOP includes a plurality of priority-based channel sensing periods and a transmission period; and communicate with the wireless communication device during a first channel sensing period of the plurality of priority-based channel sensing periods in the TXOP corresponding to the access priority of the first network operating entity based on the dynamic priority information, a reservation for the shared spectrum in the transmission period of the TXOP.

24. The apparatus of claim 23, wherein the TXOP includes an acquisition period, and wherein the dynamic priority information is received in the acquisition period.

25. The apparatus of claim 23, wherein the transceiver is further configured to communicate the reservation with the wireless communication device by receiving, from the wireless communication device during the first channel sensing period of the plurality of priority-based channel sensing periods corresponding to the access priority of the first network operating entity, the reservation for the shared spectrum in the transmission period.

26. The apparatus of claim 23, wherein the dynamic priority information further indicates at least one of a duration of the TXOP, a number of the plurality of priority-based channel sensing periods in the TXOP, or a duration of each of the plurality of priority-based channel sensing periods.

27. The apparatus of claim 23, wherein the transceiver is further configured to receive the dynamic priority information by receiving a preamble signal carrying a cyclically-shifted preamble sequence indicating the access priority of the first network operating entity in the TXOP.

28. The apparatus of claim 27, wherein the cyclically-shifted preamble sequence is a Zadoff-Chu (ZC) sequence.

29. The apparatus of claim 28, further comprising a processor configured to:
determine a cross-correlation signal between the preamble signal and a ZC root sequence; and
identify the access priority of the first network operating entity based on energy detection over a plurality of search windows within the cross-correlation signal, wherein the plurality of search windows are positioned based on a plurality of cyclic shifts corresponding to access priorities in the TXOP.

30. The apparatus of claim 28, further comprising a processor configured to:
determine a cross-correlation signal between the preamble signal and a ZC root sequence; and
identify the access priority of the first network operating entity based on energy detection over a plurality of sub-windows of a search window within the cross-correlation signal, wherein the search window is positioned based on a cyclic shift associated with the first network operating entity, and wherein the plurality of sub-windows corresponds to access priorities in the TXOP.

* * * * *